US009428224B2

(12) United States Patent
Saje et al.

(10) Patent No.: US 9,428,224 B2
(45) Date of Patent: Aug. 30, 2016

(54) DRAINABLE SECTION STABILIZER SLEEVE

(71) Applicant: GM Global Technology Operations LLC, Detroit, MI (US)

(72) Inventors: Robert N. Saje, Shelby Township, MI (US); John C. Johnson, Macomb Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 33 days.

(21) Appl. No.: 13/929,930

(22) Filed: Jun. 28, 2013

(65) Prior Publication Data

US 2015/0001822 A1 Jan. 1, 2015

(51) Int. Cl.
*B62D 25/24* (2006.01)

(52) U.S. Cl.
CPC .................................... *B62D 25/24* (2013.01)

(58) Field of Classification Search
CPC ...... B62D 21/00; B62D 21/02; B62D 21/16; B62D 21/17; B62D 29/008
USPC .......... 180/311, 312; 280/781, 782; 296/203.01, 208, 209, 213, 154; 52/302.5, 297, 298
See application file for complete search history.

(56) References Cited

U.S. PATENT DOCUMENTS

| 1,517,677 | A | * | 12/1924 | Heinkel | 220/243 |
| 1,965,639 | A | * | 7/1934 | Glass | 248/353 |
| 2,315,516 | A | * | 4/1943 | Gray | 256/1 |
| 4,732,175 | A | * | 3/1988 | Pareja | 138/30 |
| 4,958,743 | A | * | 9/1990 | Hatton et al. | 220/288 |
| 5,193,643 | A | * | 3/1993 | McIntyre | 180/312 |
| 5,273,384 | A | * | 12/1993 | Dunbar | 411/428 |
| 5,303,730 | A | * | 4/1994 | Trueb et al. | 137/375 |
| 5,309,691 | A | * | 5/1994 | Tolliver et al. | 52/583.1 |
| 5,379,563 | A | * | 1/1995 | Tinsley | 52/295 |
| 5,537,794 | A |  | 7/1996 | Tolliver et al. |  |
| 6,250,524 | B1 | * | 6/2001 | Maruyama | 224/42.24 |
| 6,289,532 | B1 | * | 9/2001 | Fritz et al. | 4/679 |
| 6,290,279 | B1 | * | 9/2001 | Haight et al. | 296/97.23 |
| 6,361,099 | B1 | * | 3/2002 | McIntosh et al. | 296/97.23 |
| 6,523,857 | B1 | * | 2/2003 | Hopton et al. | 280/756 |
| 7,628,259 | B2 |  | 12/2009 | Norgaard et al. |  |
| 8,146,933 | B2 | * | 4/2012 | Croyle et al. | 280/124.155 |
| 8,689,922 | B2 | * | 4/2014 | Kishikawa | 180/219 |
| 2004/0245033 | A1 |  | 12/2004 | Saeki |  |
| 2007/0051573 | A1 | * | 3/2007 | Norgaard et al. | 188/314 |
| 2010/0003103 | A1 | * | 1/2010 | Takano | 411/103 |
| 2010/0303579 | A1 | * | 12/2010 | Muller et al. | 411/166 |
| 2011/0315494 | A1 | * | 12/2011 | Marking | 188/281 |
| 2012/0222927 | A1 | * | 9/2012 | Marking | 188/274 |

OTHER PUBLICATIONS

Chinese Office Action dated Jan. 20, 2016;Application No. 201410303148.2; Applicant : GM Global Technology Operations LLC.; 5 pages.

* cited by examiner

*Primary Examiner* — Drew Brown
(74) *Attorney, Agent, or Firm* — BrooksGroup

(57) ABSTRACT

A product comprising a drainable section stabilizer sleeve for a vehicle body structure.

22 Claims, 1 Drawing Sheet

DRAINABLE SECTION STABILIZER SLEEVE

TECHNICAL FIELD

The field to which the disclosure generally relates to includes vehicle body structures.

BACKGROUND

A vehicle body structure may include one or more reinforcements.

SUMMARY OF ILLUSTRATIVE VARIATIONS

One variation may include a product comprising a drainable section stabilizer sleeve for a vehicle body structure.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

One variation may include a product comprising a drainable stabilizer sleeve for a vehicle body structure.

Figure 1:
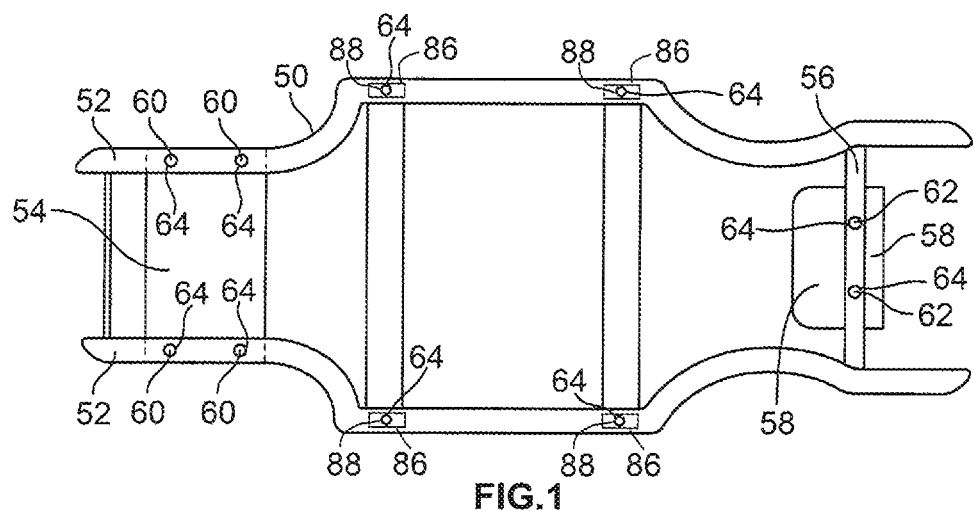
FIG. 1 depicts a vehicle structure according to a number of variations.

Referring to FIG. 1, a vehicle may include a vehicle body structure 50. Various areas or sections 60, 62, 88 of the body structure 50 may be exposed to various stresses which may cause weakening or deformation of the section 60, 62, 88. For example, the sections 60 where the front rails 52 attach to a front cradle 54, the sections 62 where the 6-bar 56 attaches to a rear cradle 58, as well as the sections 88 where an underbody bracing attachment 86 may be attached to the rocker 84 may be exposed to stresses or loads which may increase the risk of weakening or deformation of the section 60, 62, 88.

Figure 2:
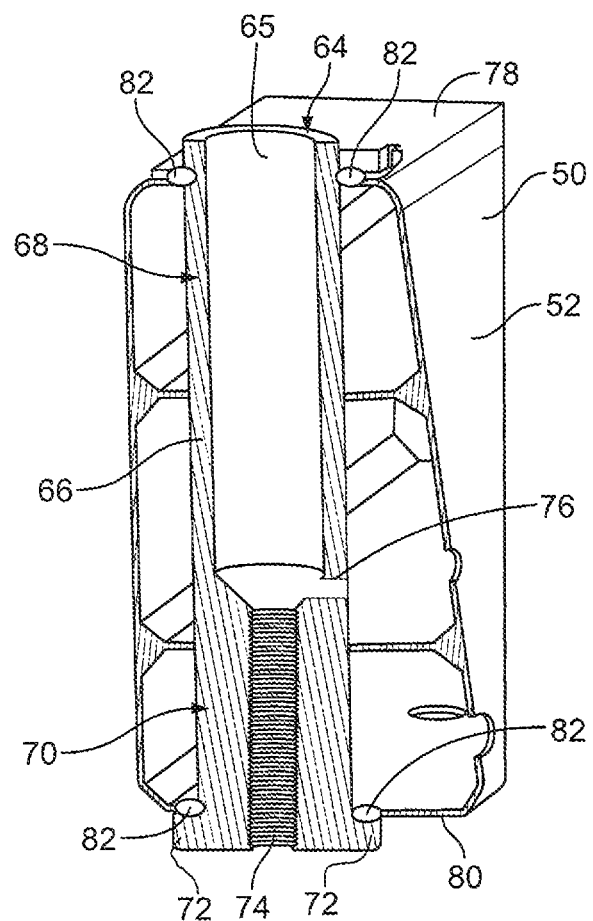
FIG. 2 depicts a drainable section stabilizer sleeve according to a number of variations.

Referring to FIG. 2, a drainable section stabilizer sleeve 64 may be used to add additional local stiffness to a section 60, 62, 88 which may prevent or reduce deformation or weakening of a section 60, 62, 88 exposed to increased stress or loading. The drainable section stabilizer sleeve 64 may also add increased stability to the section 60, 62, 88.

In one variation, a drainable section stabilizer sleeve 64 may include a body 66 which may be constructed and arranged to fit inside a section 60, 62, 88 of a vehicle body structure 50. The body 66 may include an upper portion 68 and a lower portion 70. The upper portion 68 of the body 66 may be hollow which may reduce the mass of the drainable section stabilizer sleeve 64 as well as the overall mass of the vehicle. The lower portion 70 of the body 66 may include a feature which may close out the section 60, 62, for example, a threaded bore 74 which may extend through the length of the lower portion 70 of the body 66 which may be constructed and arranged to mate with a mechanical fastener (not illustrated) such as a threaded bolt. The close out feature may be used to attach a section 60, 62, 88 of the vehicle structure to another vehicle component, for example, but not limited to, a front rail 52, or 6-bar 56 to a front cradle 54 or a rear cradle 58, as illustrated in FIG. 2, or a rocker 84 to an underbody bracing attachment 86. One or more holes 76 may be located in the body 66 adjacent to the close out feature in the lower portion 70 of the body 66 of the drainable section stabilizer sleeve 64, which may prevent water and/or other contaminants from collecting inside of the drainable section stabilizer sleeve 64 and may reduce corrosion of the drainable section stabilizer sleeve and/or the close out feature 74. The lower portion 70 may also include a flange or lip 72 which may extend radially from the perimeter of the lower portion 70 of the body 66.

The drainable section stabilizer sleeve 64 may be inserted into a cavity of the section 60, 62, 88 of a vehicle body structure 50 so that the flange or lip 72 of the body 66 of the drainable section stabilizer sleeve 64 is flush with the lower surface 80 of the vehicle body structure 50. A portion of the drainable section stabilizer sleeve 64 may extend past the upper surface 78 of the vehicle body structure 50.

The upper portion 68 of the drainable section stabilizer sleeve 64 may be welded 82 to the upper surface 78 of the vehicle body structure 50, for example as illustrated in FIG. 2. The flange or lip 72 may also be welded 82 to the lower surface 80 of the vehicle body structure 50. The welding 82 may additionally secure the drainable section stabilizer sleeve 64 into place.

The drainable section stabilizer sleeve 64 may be formed in any of a number of variations. In one variation, the body 66 may be an extruded structure wherein the upper portion 68 may have a bore 65 the diameter of which may be increased after the extrusion by drilling out material. The bore in the lower portion 70 may be threaded after the extrusion. The flange or lip 72 of the extruded body may be formed via "cold heading" wherein the material may be flattened to create the flange or lip 72. The drainable section stabilizer sleeve 64 may be comprised of any of a number of materials including, but not limited to aluminum or aluminum alloy.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a product comprising: a stabilizer sleeve; wherein the stabilizer sleeve includes a body; wherein the body includes an upper portion and a lower portion; wherein the upper portion is hollow; wherein the lower portion includes a close out feature; and wherein the upper portion of the body includes at least one hole.

Variation 2 may include a product as set forth in claim 1 wherein the close out feature is a central thread which is constructed and arranged to mate with a mechanical fastener.

Variation 3 may include a product as set forth in any of Variations 1-2 wherein the at least one hole is located adjacent the close out feature.

Variation 4 may include a product as set forth in any of Variations 1-3 wherein the lower portion of the body includes a lip.

Variation 5 may include a product as set forth in any of Variations 1-4 wherein the stabilizer sleeve is cylindrical.

Variation 6 may include a product as set forth in any of Variations 1-5 wherein the stabilizer sleeve comprises aluminum.

Variation 7 may include a product as set forth in any of Variations 1-6 wherein the stabilizer sleeve comprises aluminum alloy.

Variation 3 may include a product as set forth in any of Variations 1-7 wherein the stabilizer sleeve is extruded.

Variation 9 may include a product as set forth in any of Variations 1-8 wherein the stabilizer sleeve is constructed and arranged to be inserted into a cavity of a section of a vehicle body structure.

Variation 10 may include a product as set forth in any of Variations 1-9 wherein the stabilizer sleeve is attached to the vehicle body structure.

Variation 11 may include a product as set forth in any of Variations 1-10 wherein the vehicle body structure includes an upper surface and a lower surface; wherein the upper portion of the body of the stabilizer sleeve is welded to the upper surface of the vehicle body structure; and wherein the lower portion of the stabilizer sleeve is welded to the lower surface of the vehicle body structure.

Variation 12 may include a product as set forth in any of Variations 1-11 wherein the section of the vehicle body structure is a front rail.

Variation 13 may include a product as set forth in any of Variations 1-11 wherein the section of the vehicle body structure is a 6-bar.

Variation 14 may include a product as set forth in any of Variations 1-11 wherein the section of the vehicle body structure is a rocker.

Variation 15 may include a product as set forth in any of Variations 1-14 wherein the vehicle body structure and the stabilizer sleeve are attached to a vehicle component.

Variation 16 may include a product as set forth in any of Variations 1-15 wherein the vehicle component is a cradle.

Variation 17 may include a product as set forth in any of Variations 1-16 wherein the vehicle component is an underbody bracing attachment.

The above description of select examples of the invention is merely illustrative in nature and, thus, variations or variants thereof are not to be regarded as a departure from the spirit and scope of the invention.

What is claimed is:

1. A product comprising:
   a stabilizer sleeve;
   wherein the stabilizer sleeve includes a body;
   wherein the body includes a close out feature and a hollow portion;
   wherein the body includes at least one lateral hole which abuts the close out feature; and wherein the close out feature is a threaded bore which is constructed and arranged to mate with a mechanical fastener.

2. The product of claim 1 wherein a lower portion of the body includes a lip.

3. The product of claim 1 wherein the stabilizer sleeve is cylindrical.

4. The product of claim 1 wherein the stabilizer sleeve comprises aluminum.

5. The product of claim 1 wherein the stabilizer sleeve comprises aluminum alloy.

6. The product of claim 1 wherein the stabilizer sleeve is extruded.

7. The product of claim 1 wherein the stabilizer sleeve is constructed and arranged to be inserted into a cavity of a vehicle body structure.

8. The product of claim 7 wherein the stabilizer sleeve is attached to the vehicle body structure.

9. The product of claim 8 wherein the vehicle body structure includes an upper surface and a lower surface;
   wherein an upper portion of the body of the stabilizer sleeve is welded to the upper surface of the vehicle body structure; and
   wherein a lower portion of the stabilizer sleeve is welded to the lower surface of the vehicle body structure.

10. The product of claim 7 wherein the vehicle body structure is a section of a front rail.

11. The product of claim 7 wherein the vehicle body structure is a section of a 6-bar.

12. The product of claim 7 wherein the vehicle body structure is a section of a rocker.

13. The product of claim 8 wherein the vehicle body structure and the stabilizer sleeve are attached to a vehicle component.

14. The product of claim 10 wherein the section of the front rail is attached to a cradle via the close out feature.

15. The product of claim 12 wherein the section of the rocker is attached to an underbody bracing attachment via the close out feature.

16. The product of claim 11 wherein the section of the 6-bar is attached to a cradle via the close out feature.

17. The product of claim 8 wherein the section stabilizer provides localized stiffness to the vehicle body structure.

18. A product comprising:
    a stabilizer sleeve;
    wherein the stabilizer sleeve includes a body;
    wherein the body includes an upper portion and a lower portion;
    wherein the upper portion is hollow;
    wherein the lower portion includes a close out feature; and
    wherein the stabilizer sleeve is constructed and arranged to be inserted into a cavity of a section of a vehicle 6-bar or a section of a vehicle rocker.

19. The product of claim 18 wherein the stabilizer sleeve is inserted into the section of the 6-bar, and wherein the 6-bar is attached to a cradle via the close out feature.

20. The product of claim 18 wherein the stabilizer sleeve is inserted into the section of the rocker, and wherein the rocker is attached to an underbody bracing attachment via the close out feature.

21. A product comprising:
    a stabilizer sleeve;
    wherein the stabilizer sleeve includes a body;
    wherein the body includes an upper portion and a lower portion;
    wherein the upper portion is hollow;
    wherein the lower portion includes a close out feature;
    wherein the upper portion of the body includes at least one hole located at a bottom end of the upper portion of the body adjacent the close out feature;
    wherein the stabilizer sleeve is attached to a vehicle body structure, wherein the vehicle body structure includes an upper surface and a lower surface; and
    wherein the upper portion of the body of the stabilizer sleeve is welded to the upper surface of the vehicle body structure and the lower portion of the stabilizer sleeve is welded to the lower surface of the vehicle body structure.

22. A product comprising:

a stabilizer sleeve;

wherein the stabilizer sleeve includes a body;

wherein the body includes an upper portion and a lower portion;

wherein the upper portion is hollow;

wherein the lower portion includes a close out feature;

wherein the upper portion of the body includes at least one drain hole located at a bottom end of the upper portion of the body adjacent the close out feature;

wherein the stabilizer sleeve is inserted into a cavity of a section of a front rail; and wherein the section of the front rail is attached to a cradle via the close out feature.

\* \* \* \* \*